United States Patent [19]
Anjo

[11] Patent Number: 5,046,014
[45] Date of Patent: Sep. 3, 1991

[54] AUTOMATIC TOOL POSITION RECOGNIZING DEVICE RECOGNIZING BAR CODES ON TOOLS

[76] Inventor: Toshiaki Anjo, Tanaka Apartment B-6, 7058 Okazaki, Isheara-shi, Kanagawa-ken, Japan

[21] Appl. No.: 215,484

[22] Filed: Jul. 6, 1988

[51] Int. Cl.⁵ .......................................... G06F 15/46
[52] U.S. Cl. ........................ 364/474.02; 364/474.21; 29/568
[58] Field of Search ..................... 364/474.02, 474.11, 364/474.21, 474.37, 413.28; 29/568, 26 A; 101/288; 33/628, 630, 174 L, 185 R; 235/375, 462; 318/565

[56] References Cited

U.S. PATENT DOCUMENTS

| | | | |
|---|---|---|---|
| 4,533,823 | 8/1985 | Vittorio | 235/375 |
| 4,592,146 | 6/1986 | Campbell | 33/185 R |
| 4,631,465 | 12/1986 | Fukuyama et al. | 318/565 |
| 4,900,252 | 2/1990 | Liefke et al. | 433/27 |
| 4,922,591 | 5/1990 | Campbell | 29/26 A |

*Primary Examiner*—Jerry Smith
*Assistant Examiner*—Paul Gordon
*Attorney, Agent, or Firm*—Cushman, Darby & Cushman

[57] ABSTRACT

An automatic tool position recognizing device. This device reads symbols, preferably bar codes, from each of a plurality of respective tools. A plurality of tools are located in a sequencing device, and the sequencing device is rotated such that each tool is sequentially located adjacent a sensor. The sensor senses the bar code from each tool, and sends it to a storage device. This storage device includes a table between each bar code and a particular tool that it corresponds to. The position of the sequencer is also obtained. A table between the position and the particular tool is then made, so that an operator can confirm which particular tool is located at any particular position.

15 Claims, 5 Drawing Sheets

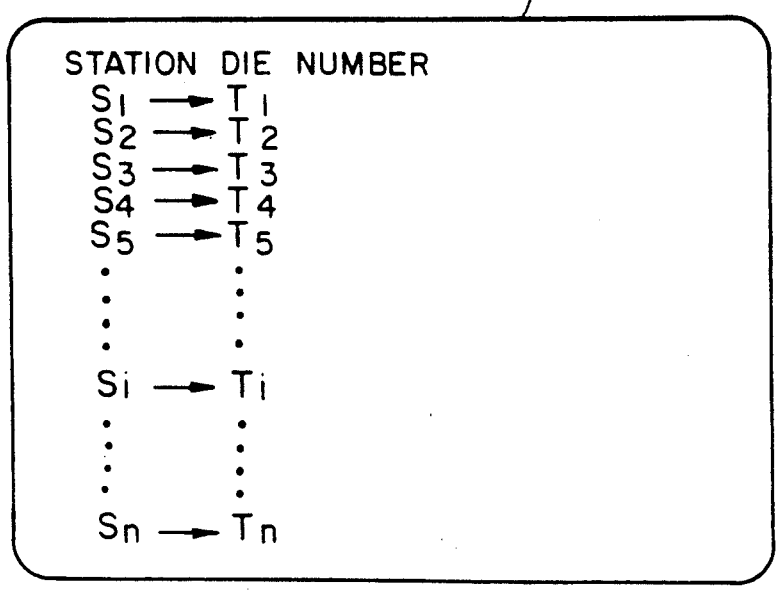

AUTOMATIC TOOL POSITION RECOGNIZING DEVICE RECOGNIZING BAR CODES ON TOOLS

BACKGROUND OF THE INVENTION

1. Field of the Invention

The present invention relates to a tool-recognizing device which recognizes tools mounted on a tool holder of a turret punch press.

2. Description of the Prior Art

In a conventional numerically controlled (NC) turret punch press, dies or tools to be used by the press are sequentially designated by a predetermined program which sequentially chooses dies and tools one after the other.

Therefore, when an NC table is prepared, the station numbers given to the dies must be confirmed. Such has been typically done by manual verification using shapes of the dies. Such a manual confirming operation, however is difficult and labor intensive.

For example, when an upper portion of a frame is close to the top of the turret on a punch press, the operator has been forced to assume a considerably uncomfortable posture in order to read the dies to check the station numbers and the shapes. Furthermore, because a large number of such dies are mounted on the turret, a relatively long time is taken to confirm all the dies.

Accordingly, this greatly deteriorates the efficiency at which NC tapes are prepared.

SUMMARY OF THE INVENTION

The present invention has been made to solve these problems. It is an object of the invention to provide a tool recognizing device which is for use with a turret punch press and which permits the operator to confirm tools easily and certainly, even if they are mounted on the tool holder at random.

The above object is achieved by providing a tool-recognizing device and method which is for use with a numerically controlled turret punch press, including a rotatable tool holder having a plurality of tool installation stations, where tools marked with symbols corresponding to tool numbers assigned to the tools are mounted. The symbols are preferably bar codes. This device has a sensor which is disposed near the tool holder and acts to read the symbols from the tools; a storage device which corresponds to the tools and which, when the tool holder is rotated, converts the output signal from the sensor into corresponding tool numbers and stores the tool numbers; and a display device which is connected with the storage device and which visually displays the tool numbers stored in the storage device, corresponding to the tool installation numbers.

In typical operation of the invention, the operator mounts a plurality of tools on the tool holder at random. These tools may be, for example, dies necessary for a machining operation. The operator then activates the tool-recognizing device of this embodiment. Data indicating which tools are installed at what tool installation stations of the tool holder is stored, and presented to the user on a CRT. Therefore, the operator can easily and certainly recognize the relation of the tool numbers to the station numbers. This allows the time necessary to check the tools to be shortened. Also, an NC tape can be prepared with improved efficiency.

BRIEF DESCRIPTION OF THE DRAWINGS

The presently preferred embodiments of the invention will be described with reference to the accompanying drawings wherein:

FIG. 4 is a conceptual representation of die numbers stored in a storage, device corresponding to dies;

FIG. 5 shows data displayed on a CRT; and

DETAILED DESCRIPTION OF THE PREFERRED EMBODIMENT

Figure 1:
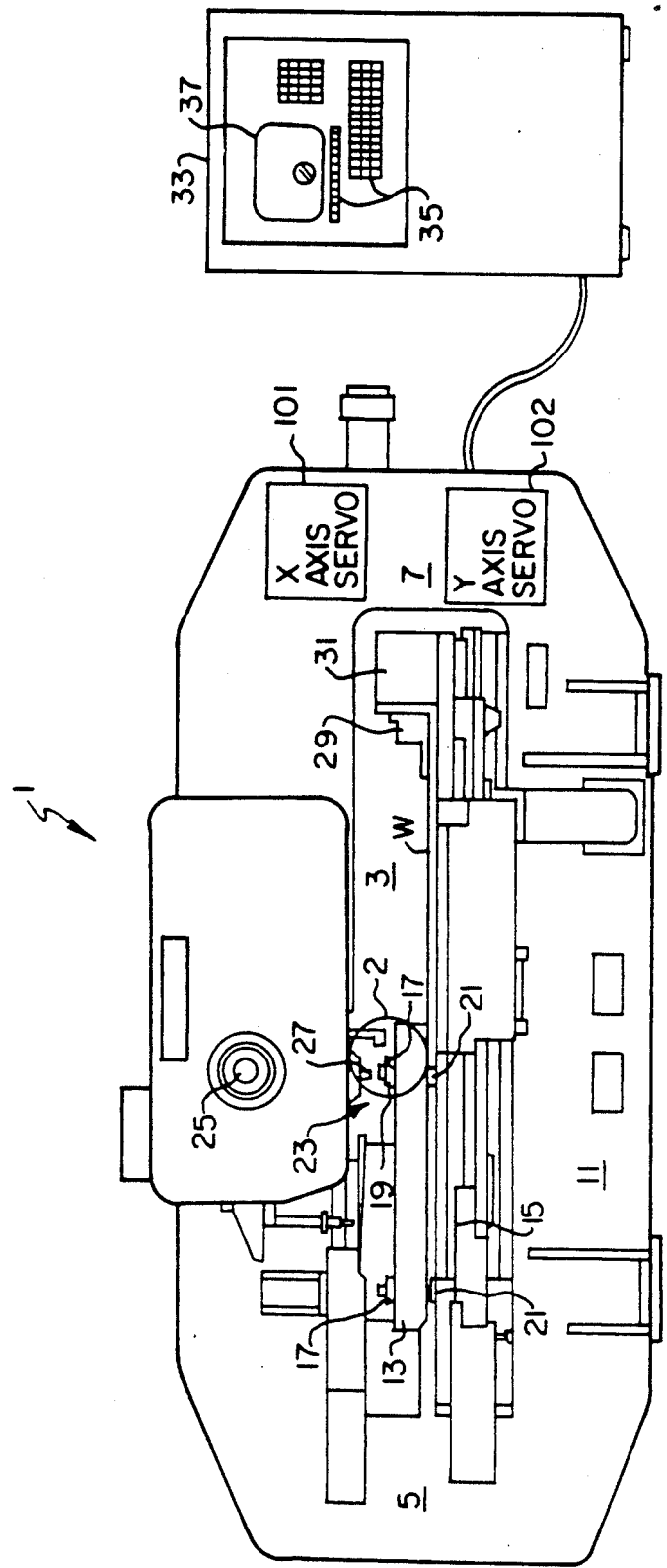
FIG. 1 is a front elevation of a turret punch press equipped with a tool-recognizing device according to the invention.

An embodiment of the invention is hereinafter described in detail with reference to the drawings. FIG. 1 shows a front elevation of the turret punch press equipped with a tool-recognizing device according to the invention.

Referring to FIG. 1, the turret punch press, generally indicated by reference numeral 1, has a left column 5 and a right column 7 which are disposed on opposite sides of a central gap 3. Also, an upper frame 9 and a lower frame 11 are positioned on opposite sides of the gap 3. These columns and frames constitute a portal structure. An upper turret board 13 and a lower turret board 15 are mounted at the left end of the gap 3 as viewed in FIG. 1.

The upper board 13 is connected to the upper frame 9 and has a plurality of punch-mounting portions 19 that are arranged in a circle. Upper dies (or punches 17) can be mounted on the punch-mounting portions 19, one on each. The lower board 15 also has a plurality of die mounts on which lower dies 21 can be mounted. The lower dies 21 cooperate with the upper dies 17 on the upper board 13.

The upper board 13 and the lower board 15 of the turret are rotated in synchronism with each other by a chain or the like driving means, (not shown) to bring the punches 17 and the dies 21 to a machining station, or punch center 23.

A striker 27 is disposed in a way such that it can be driven up and down by crankshaft 25. The striker 27 is disposed above the machining station 23, the crankshaft 25 being mounted to the upper frame 9. The striker 27 can be quickly lowered at a given timing to collide against the head of the punch 17 to, for example, drill a hole through a workpiece W at a given position between the punch 17 and the corresponding die 21. A clamping device 29 is mounted on the upper frame 11 and located at the right of the upper board 13 and the lower board 15 of the turret. The clamping device 29 grips one end of the workpiece W. In this embodiment, workpiece W typically takes the form of a plate, for example, and brings a desired portion of the workpiece W into the machining station 23. In order to facilitate this operation, the clamping device 29 is rigidly fixed to a carriage 31 that is movable within an XY plane. The carriage 31 is driven by a numerical controller 33 connected to the turret punch press 1.

The numerical controller 33 instructs X-axis driving and Y-axis driving servomotors 101 and 102 to drive the carriage 31. The controller 33 also controls the rotation of the upper board 13 and the lower board 15 of the turret so that desired punch 17 and die 21 may be moved to the machining station 23.

A plurality of groups of keys 35 are provided on the control panel of the numerical controller 33 to facilitate entry of various instructions and data. Also, a CRT 37 is installed on numerical controller 33 to display various messages.

Figure 2:
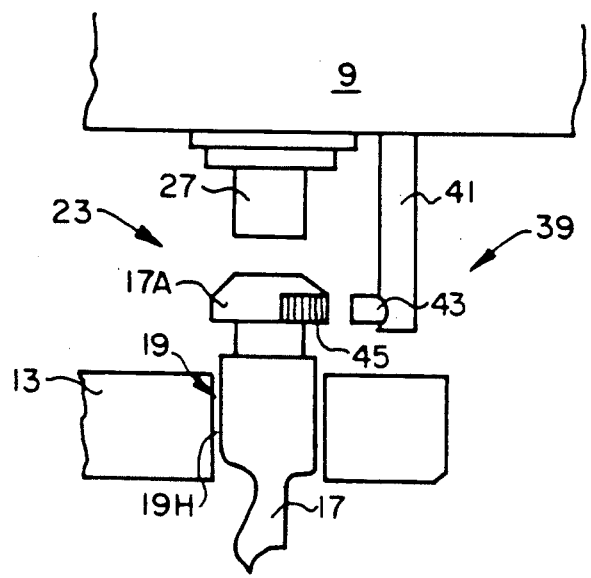
FIG. 2 is an enlarged view of the portion surrounded by the circle 2—2 in FIG. 1.

In the present embodiment, a tool-recognizing device 39 is mounted at the machining station 23 of the punch press 1 within the circle 2—2. Circle 2—2, including tool recognizing device 39, is shown in more detail in FIG. 2. Specifically, the tool recognizing device 39 includes a bracket 41 extending downward from the underside of the upper frame 9. A sensor 43 is provided for reading symbols, in this embodiment bar codes, from punches 17, and is mounted on the side surface of the bracket 41 near the bottom of the bracket.

A plurality of holes 19H are formed on the circle 19 of the upper board of turret 13 to mount the respective punches 17. These holes constitute the punch-mounting portions 19. A different installation station number is assigned to each hole 19H to discriminate these holes 19H from each other. Each punch 17 is adapted for performing a predetermined machining operation, such as drilling, and one punch is installed in each hole 19H. A bar code is printed on the head 17A of each punch 17, to represent the dimensions and the shapes of the punch 17 and the die 23. Preferably, the code 45 is embedded in the head 17A of the punch 17. The code 45 is disposed close to and opposite to the sensor 43.

Therefore, when the upper board of turret 13 is rotated, each tool 17 in each tool-mounting portion 19 can have their bar code 45 read by the sensor 43 as they approach the sensor.

Figure 3:
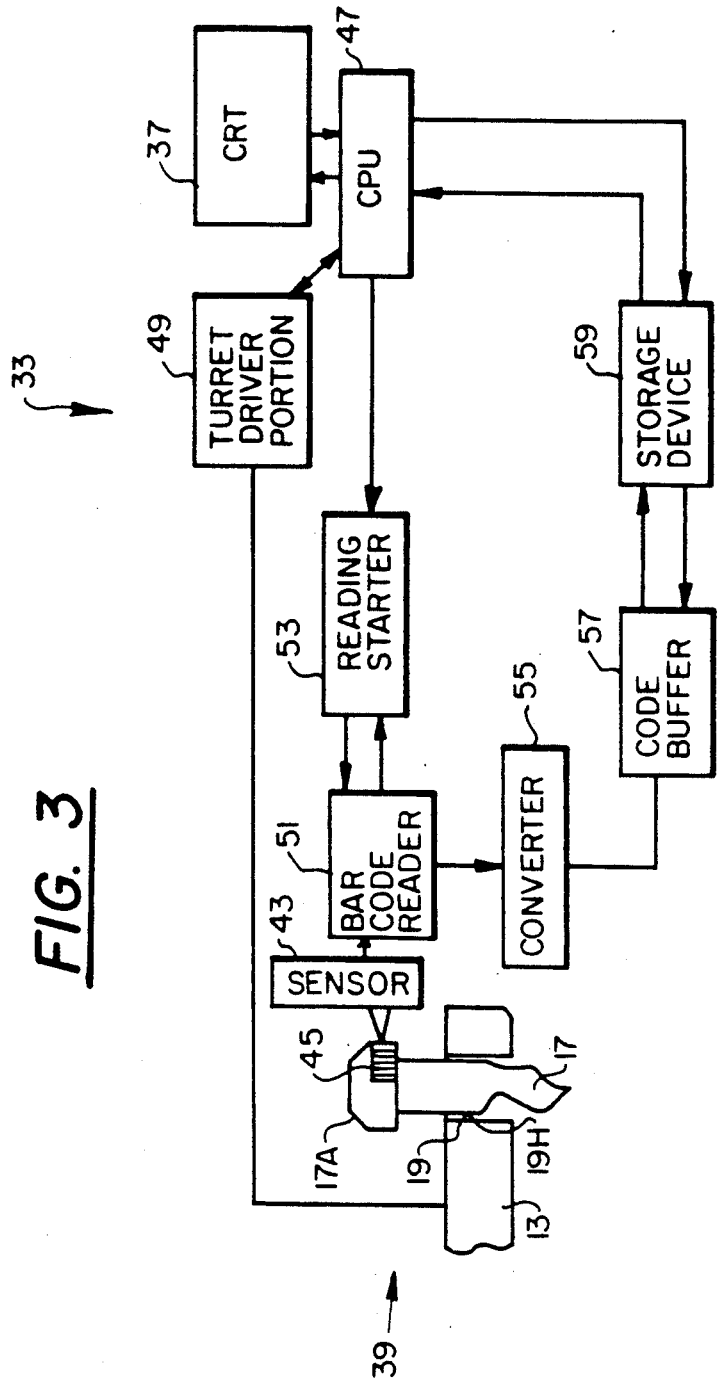
FIG. 3 is a block diagram of one example of the tool-recognizing device shown in FIG. 1.

A specific example of the tool-recognizing device 39 is now described by referring to FIG. 3. The numerical controller 33 for the punch press 1 includes a CPU 47, a turret driver portion 49 for driving the upper board of turret 13, and the CRT 37 acting as the display device on which data regarding the dies is displayed. The driving of the upper board of turret 13 as described in FIG. 1 is shown with the upper board 13 being driven by the turret driver portion 49 in accordance with instructions from the CPU 47.

A bar code reader 51 for reading the bar code 45 that is written on the head 17A of the punch 17 is connected to the sensor 43. A reading starter 53 is connected with the reader 51 to command the bar code reader 51 into operation in accordance with instructions given by the CPU 47.

A converter 55 is connected with the bar code reader 51 to transform the code 45 read by the reader into another kind of signal. A storage device 59 corresponding to the dies is connected with the converter 55 via a code buffer 57. The CPU 47 is connected to the storage device 59.

The output signal from the converter 55 is fed via the code buffer to the storage device 59. Storage device 59 includes a storage of all registration numbers, one for each of the dies which are possible to be used in the unit. These registration numbers are stored in advance in storage device 59. When a particular input code is sent to the code buffer 57, this translates into a corresponding die registration number. A die number for each recognized die is also sequentially stored in storage device 59. This corresponding registration number can be compared and recognized using the data in storage device 59.

To operate the system, CPU 47 commands the turret driver portion 49 to rotate the upper board of turret 13 to perform one rotation. During this rotation, the bar codes 45 on each of the punches or dies 17, installed in the holes 19H in the tool-mounting portions 19, are sequentially read in the manner as described above. This results in a table shown in FIG. 4, with numbers being assigned to all the dies, the table being stored in the storage device 59.

The die numbers stored in the storage device 59 are then transferred to the CPU 47, where the numbers given to the tool installation stations of the upper board of turret 13 are stored. Both kinds of numbers are then presented on the CRT 37 as shown in FIG. 5 so that the die numbers correspond to the station numbers. The operator sees the list of the station numbers and the die numbers displayed on the CRT 37 to confirm what dies are mounted at what stations.

Once the operator selects the proper dies used for respective machining operations, he can confirm the dies with ease and certainty using the novel tool-recognizing device at whatever stations the dies are mounted, even though this mounting may be at random. Hence, it is unnecessary for the operator to assume an uncomfortable posture, which would have been inevitable before the present invention.

Where the die numbers are checked, dies used for the turret punch press can also be checked, as well as the punches.

Figure 7:
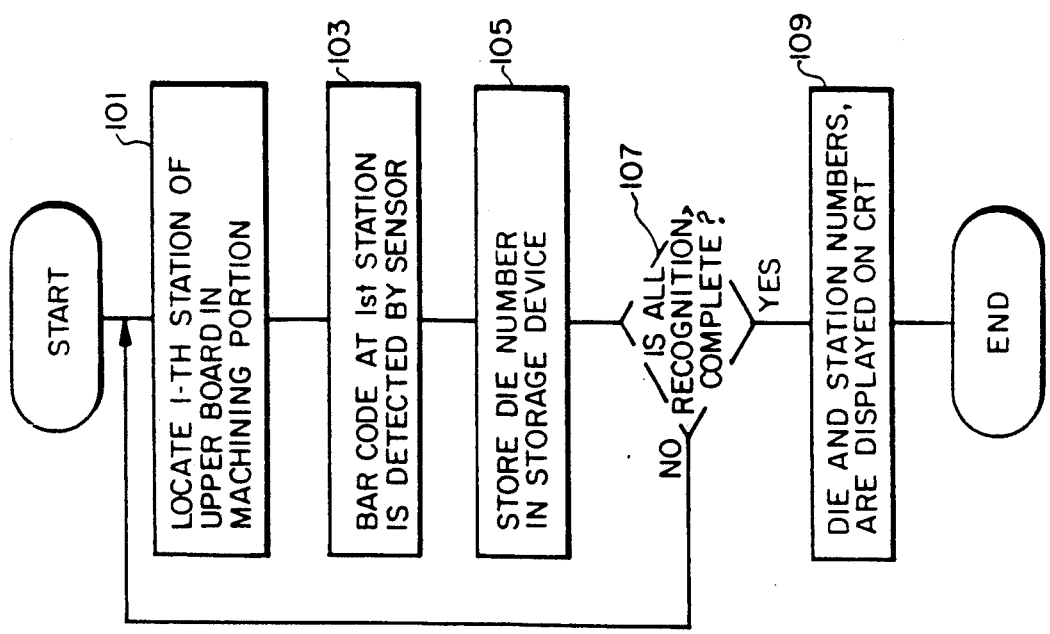
FIGS. 6 and 7 are flowcharts illustrating the operation of the tool-recognizing device.
Figure 6:
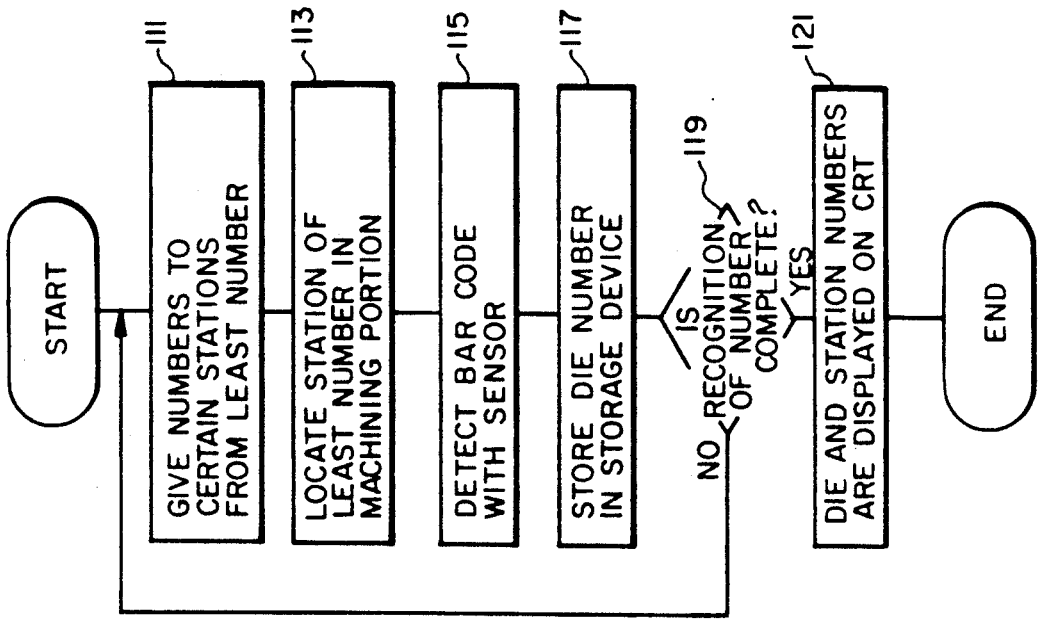

The operation of the present invention is next described by referring to the flowcharts of FIGS. 6 and 7.

FIG. 6 shows a series of operations performed to recognize tools when all the stations of the upper board of turret 13 are filled with dies. First, the CPU 47 instructs the turret driver 49 to locate the i-th station of the upper board of turret 13 in the machining portion 23 at step 101. It will be assumed for the purposes of this explanation that, e.g., 20 station numbers are available. The station bearing the lowest number, or 1, is placed in position. Then, the bar code 45 on the head 17A of the punch, which is the die mounted at the first station, is detected by the sensor 43 at step 103.

The output signal from the sensor 43 is fed to the storage device 59 via the bar code reader 51, the converter 55, and the code buffer 57 to store the die number of the punch 17 in the storage device 59 at step 105.

A decision is made at step 107 to see whether the recognition of the dies or punches 17 at all the stations has been completed, i.e., whether all the station numbers have been recognized. If only one number has been read, for example, all recognition is not complete, and control returns to step 101. The above-described procedure is repeated until all the dies or punches 17 installed at all the stations are all recognized. Since there are 20 stations, the above-described sequence is repeated 20 times. This results in a table including all die numbers being sequentially stored beginning with the lowest number station, as shown in FIG. 4.

A further table is then made to correlate the numbers, in this case twenty die numbers, to the station numbers. Since the table of FIG. 4 is known to include a sequential list of die recognition numbers, beginning with the lowest order station, it can easily be revised into a functional table such as shown in FIG. 5. This functional table includes a correspondence between station numbers (e.g., S1 . . . SN) and die recognition numbers (shown in the table as TN).

The twenty station numbers are successively stored by the CPU 47, e.g. as the upper board of turret 13 is turned once (step 109). Then, both kinds of numbers are displayed on the CRT 37 as shown in FIG. 5. Therefore, the operator can easily and certainly confirm at which tool installation stations the selected dies are mounted, by checking the station numbers and the die numbers displayed on the CRT 37.

FIG. 7 shows an example of the operation to recognize tools mounted at specified ones of the stations. Numbers are successively assigned to certain tool installation stations beginning at a lowest number at step 111. As an example, the total number of stations is 20. Punches 17 are mounted at the stations bearing odd numbers, such as 1, 3, 5, . . . , 17, 19. The numbers 1, 3, 5, . . . , 17, 19 are entered in this order into the CPU 47. The station having the lowest number is then located to the machining portion 23 at step 113. That is, the station bearing number 1 is located at the machining portion 23.

Steps 115 and 117 similar to steps 103 and 105, respectively shown in FIG. 6 are then carried out as steps 115 and 117 respectively.

A decision is made to determine whether the recognition of the die or the punch 17 mounted at the given station has been completed at step 119. Specifically, if only number one has been read and control goes back to step 111 to repeat until all numbers so read. Thereafter, the bar code 45 on the head 17A of each punch 17 mounted at the tool installation stations bearing odd numbers 3, 5, . . . , 17, 19 are each read.

Step 121 is similar to step 109 illustrated in FIG. 6.

Therefore, the die numbers can be confirmed certainly and easily in the same manner as in the case illustrated in connection of FIG. 6.

As can be understood from the foregoing examples of the invention, in accordance with the invention, the tool numbers given to the tools mounted on the tool holder can be easily and certainly confirmed, corresponding to the tool installation station numbers, by means of the tool-recognizing device. Since the operator can mount tools at random on the tool holder, the operation for checking the tools can be effected in a shortened time. Also, a tape for numerical control can be prepared with improved efficiency.

Although only a few embodiments have been discussed above, those having ordinary skill in the art will certainly recognize that many modifications are possible in these embodiments without departing from the scope thereof. For example, dimensions and shapes of the dies corresponding to die numbers may be stored in the storage device as a recognition code. In this case, if a certain die number were specified, the dimensions of the corresponding die could be displayed on the CRT and could be recognized. Alternately, any other means of recognition could be used to determine each die. Although the table of FIG. 5 was described as being acquired as the turret is running, it could just as easily be done after completion of the operation.

Accordingly, all such modifications are intended to be embodied within the following claims.

What is claimed is:

1. A tool-recognizing device for use with a numerically controlled turret punch press including a rotatable tool holder having a plurality of tool installation stations each having a tool installation number, each adapted to hold a tool marked with a symbol corresponding to a tool number assigned to the tool, said tool-recognizing device comprising:
    sensor means, disposed adjacent said tool holder, for reading a symbol from a tool;
    storage means for storing a correspondence between tool numbers and each of said read symbols, and for converting the output signal from the sensor into a corresponding tool number and storing said corresponding tool numbers;
    means for moving said tools in a way such that each symbol on each tool at each tool installation station is sequentially read by said sensor means and sent to said storage means;
    control means for determining each tool installation number of said moving means and storing a map of tool installation numbers at each of said positions of said moving means and said tool number in each said tool installation station; and
    display means, which is connected with the storage means, for visually displaying a tool number stored in the storage means in a correspondence with each respective said tool installation number.

2. The tool-recognizing device of claim 1, wherein said symbols with which the tools are marked are bar codes.

3. A device as in claim 1, wherein said storage means also stores an NC program, said controlling means including means for reading an instruction from the program, converting the instruction to a tool number, accessing said map to determine a position of said tool number and commanding said moving means to move to said position of said tool number.

4. A tool-recognizing device, comprising:
    means for recognizing a tool in a recognizing area adjacent thereto, and for producing a signal indicative of a unique identifier for a recognized tool;
    sequencing means, for holding a plurality of tools each at a predetermined position having a position number, and for sequentially moving each of said tools to said recognizing location adjacent said recognizing means, to cause said recognizing means to sequentially recognize each tool at each said position; and
    numerical control means for:
    1) storing in advance a list including a plurality of said unique identifiers,
    2) receiving said signals from said recognizing means,
    3) corresponding each said signal to one of said tools using said table, and
    4) storing a correspondence between each of said position numbers of said sequencing means and a corresponding tool at said each position number to form a map between each position of said sequencing means and a tool thereat.

5. A device as in claim 4, wherein said numerical control means also stores an Nc program, and includes means for reading an instruction from the program, converting the instruction to a tool number, accessing said map to determine a position of said tool number and commanding said moving means to move to said position of said tool number.

6. Device as in claim 4 further comprising display means, receiving said stored correspondence from said numerical control means, for displaying said correspondence.

7. Device as in claim 6 wherein each said tool includes a bar code imprinted thereon, and wherein said recognizing means includes sensor means for recognizing said bar code.

8. A device as in claim 7 wherein said numerical control means includes means for recognizing position numbers of said sequencing means.

9. A device as in claim 8 wherein said numerical control means includes a CPU, a storage device connected to said CPU, a code buffer connected to said storage device, means, connected to said sensor means of said recognizing means, for converting a read bar code into a signal indicative thereof, and also connected to said code buffer to feed said signal thereto.

10. A device as in claim 7 wherein said sequencing means includes a rotatable device, and means for rotating said device to sequentially locate each of said bar codes adjacent said sensor means.

11. A device as in claim 6 wherein said recognizing means recognizes dimension and shape of each die.

12. A method of recognizing a plurality of tools and their respective positions, comprising the steps of:
recognizing each tool which enters a recognition area;
sequencing each of the plurality of tools at all positions to pass said recognizing area in a predetermined order;
accessing a prestored list that includes a plurality of unique identifiers, each unique identifier corresponding to one of said tools;
receiving signals indicative of recognition of said tools;
corresponding each said signal to one of said tools using said list;
corresponding each said position number to said each signal indicative of a tool at a position corresponding to said position number; and
storing a correspondence between each said position number and said corresponding tool at said each position number.

13. A method as in claim 12 comprising the further step of displaying said table.

14. A method as in claim 13 wherein said tools are recognized using bar codes.

15. A method of recognizing tools for use with a numerically controlled turret press that includes a rotatable tool holder having a plurality of tool installation stations, each adapted to hold a tool marked with a symbol corresponding to a tool number, comprising the steps of:
disposing each of a plurality of tools on a sequencing device;
rotating said sequencing device to sequentially locate each of said plurality of tools near a sensor;
using said sensor to read a symbol from the tool;
translating said symbol into a unique identifier indicative of the tool;
accessing a storage device which stores a list that includes tool numbers corresponding to each of said unique identifiers;
storing a table between each said tool number and a position of said tool to from a map of each tool on said sequencing device; and
displaying said table.

* * * * *